(12) United States Patent
Lu et al.

(10) Patent No.: US 11,212,658 B2
(45) Date of Patent: Dec. 28, 2021

(54) METHOD FOR PROVIDING NEAR FILED COMMUNICATION DEVICE INFORMATION FOR USER AND SYSTEM THEREFOR

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/115,695

(22) Filed: Dec. 8, 2020

(65) Prior Publication Data

US 2021/0120391 A1 Apr. 22, 2021

Related U.S. Application Data

(63) Continuation of application No. PCT/CN2019/090154, filed on Jun. 5, 2019.

(30) Foreign Application Priority Data

Jun. 12, 2018 (CN) .......................... 201810601304.1

(51) Int. Cl.
*H04W 4/80* (2018.01)
*H04W 4/18* (2009.01)
*H04W 8/24* (2009.01)

(52) U.S. Cl.
CPC ............... *H04W 4/80* (2018.02); *H04W 4/18* (2013.01); *H04W 8/24* (2013.01)

(58) Field of Classification Search
CPC ........... H04W 4/80; H04W 4/18; H04W 8/24; H04W 4/20; H04L 69/24
See application file for complete search history.

(56) References Cited

U.S. PATENT DOCUMENTS

| 9,641,961 | B2* | 5/2017 | Maeda | ................ H04B 5/0056 |
| 10,243,619 | B2* | 3/2019 | Pieber | ................ H04B 5/0031 |

(Continued)

FOREIGN PATENT DOCUMENTS

| CN | 101400164 A | 4/2009 |
| CN | 101675428 A | 3/2010 |

(Continued)

OTHER PUBLICATIONS

International Search Report of PCT/CN2019/090154.

(Continued)

*Primary Examiner* — Lewis G West
(74) *Attorney, Agent, or Firm* — J.C. Patents (57) ABSTRACT

A communication field, more particularly to a method for providing near field communication device information for a user and a system therefor, where the method includes: when a near field communication device receives a command for reading a near field communication data exchange format file, writing the near field communication device information and a preset application identifier into the near field communication data exchange format file and sending the near field communication data exchange format file to a terminal; obtaining, by the terminal, an application identifier and the near field communication device information from the near field communication data exchange format file; initiating an application corresponding to the application identifier and storing the near field communication device information to a position readable by the application. The method provides a great convenience for a user to obtain the near field communication device information.

20 Claims, 3 Drawing Sheets

(56) References Cited

U.S. PATENT DOCUMENTS

| 10,334,441 | B2* | 6/2019 | Lu | H04L 63/0838 |
|---|---|---|---|---|
| 10,779,145 | B2* | 9/2020 | Luo | H04W 74/02 |
| 10,790,879 | B2* | 9/2020 | Zhao | H04L 69/18 |
| 2010/0017570 | A1* | 1/2010 | Gallo | G06Q 20/35765 |
| | | | | 711/154 |
| 2012/0207305 | A1 | 8/2012 | Gallo | |
| 2014/0106671 | A1 | 4/2014 | Hillan | |
| 2014/0154978 | A1* | 6/2014 | Garner | G06Q 20/3278 |
| | | | | 455/41.1 |
| 2015/0215435 | A1* | 7/2015 | Hillan | H04B 5/0025 |
| | | | | 455/41.1 |
| 2018/0225486 | A1* | 8/2018 | Teruyama | H04W 76/14 |
| 2019/0370780 | A1* | 12/2019 | Monaghan | G06Q 20/204 |
| 2021/0120391 | A1* | 4/2021 | Lu | H04W 4/80 |

FOREIGN PATENT DOCUMENTS

| CN | 104350513 A | 2/2015 |
|---|---|---|
| CN | 105812127 A | 7/2016 |
| CN | 106233689 A | 12/2016 |
| CN | 108810836 A | 11/2018 |
| KR | 20140126828 A | 11/2014 |
| WO | WO2014063331 A1 | 5/2014 |

OTHER PUBLICATIONS

The first Office Action of the priority CN application.
NFC Data Exchange Format (NDEF), NFCForum-TS-NDEF_1.0, Jul. 24, 2006.

* cited by examiner

METHOD FOR PROVIDING NEAR FILED COMMUNICATION DEVICE INFORMATION FOR USER AND SYSTEM THEREFOR

CROSS-REFERENCE TO RELATED APPLICATIONS

This application is a continuation of International Application No. PCT/CN2019/090154, filed on Jun. 5, 2019, which claims priority to Chinese Patent Application No. 201810601304.1, filed on Jun. 12, 2018, both of which are hereby incorporated by reference in their entireties.

TECHNICAL FIELD

The present disclosure relates to the field of communication, and more particularly to a method for providing near field communication device information for a user and a system therefor.

BACKGROUND

Near field communication (NFC), which is also known as near distance wireless communication, is a short-distance high frequency wireless communication technology. The near field communication is thought to have a great application prospect due to that it has better security than other wireless communication technologies.

In the prior art, when a terminal requires to obtain information of a near field communication device, it needs to organize different private commands according to different near field communication devices to obtain the information of the near field communication device, having complicated operation and bad user experience.

SUMMARY

The present disclosure provides a method for providing near field communication device information for a user, which includes following steps:

Step S1, sending, by a terminal, a command for selecting a near field communication data exchange format application to a near field communication device;

Step S2, determining, by the near field communication device, whether the near field communication data exchange format application exists; if yes, returning a success response to the terminal and executing Step S3; otherwise, ending;

Step S3, sending, by the terminal, a command for selecting a function container file to the near field communication device;

Step S4, determining, by the near field communication device, whether the function container file exists; if yes, returning a success response to the terminal and executing Step S5; otherwise, ending;

Step S5, sending, by the terminal, a command for reading the function container file to the near field communication device;

Step S6, sending, by the near field communication device, the function container file to the terminal;

Step S7, determining, by the terminal and according to the function container file, whether a near field communication data exchange format file identification exists; if yes, executing Step S8; otherwise, ending;

Step S8, sending, by the terminal, a command for selecting the near field communication data exchange format file to the near field communication device;

Step S9, determining, by the near field communication device, whether the near field communication data exchange format file exists; if yes, returning a success response to the terminal and executing Step S10; otherwise, ending;

Step S10, sending, by the terminal, a command for reading the near field communication data exchange format file to the near field communication device;

Step S11, writing, by the near field communication device, near field communication device information and a preset application identifier into the near field communication data exchange format file and sending the near field communication data exchange format file to the terminal; and Step S12, obtaining, by the terminal, an application identifier and the near field communication device information from the near field communication data exchange format file; initiating an application corresponding to the application identifier and storing the near field communication device information to a position readable by the application.

The present disclosure further provides a system for providing near field communication device information for a user, including: a terminal and a near field communication device;

the terminal includes:

a first sending module configured to send a command for selecting a near field communication data exchange format application to the near field communication device; further configured to send a command for selecting a function container file to the near field communication device when a first receiving module receives a success response after sending the command for selecting the near field communication data exchange format application; further configured to send a command for reading the function container file to the near field communication device when the first receiving module receives a success response after sending the command for selecting the function container file; further configured to send a command for selecting a near field communication data exchange format file to the near field communication device when a first determining module determines that the near field communication data exchange format file exists according to the function container file; and further configured to send a command for reading the near field communication data exchange format file to the near field communication device when the first receiving module receives a success response after sending the command for selecting the near field communication data exchange format file;

the first receiving module configured to receive a success response returned by the near field communication device; further configured to receive the function container file returned by the near field communication device; and further configured to receive the near field communication data exchange format file sent by the near field communication device;

the first determining module configured to, when the first receiving module receives the function container file, determine whether a near field communication data exchange format file identification exists according to the function container file;

an obtaining module configured to, when the first receiving module receives the near field communication data exchange format file sent by the near field communication device, obtain an application identifier and near field communication device information from the near field communication data exchange format file;

an initiating module configured to initiate an application corresponding to the application identifier obtained by the obtaining module; and a storing module configured to store the near field communication device information obtained by the obtaining module to a position readable by the application; and the near field communication device includes:

a second receiving module configured to receive the command, sent by the terminal, for selecting the near field communication data exchange format application; further configured to receive the command, sent by the terminal, for selecting the function container file; further configured to receive the command, sent by the terminal, for reading the function container file; further configured to receive the command, sent by the terminal, for selecting the near field communication data exchange format file; and further configured to receive the command, sent by the terminal, for reading the near field communication data exchange format file;

a second determining module configured to determine whether the near field communication data exchange format application exists when the second receiving module receives the command for selecting the near field communication data exchange format application; further configured to determine whether the function container file exists when the second receiving module receives the command for selecting the function container file; further configured to determine whether the near field communication data exchange format file exists when the second receiving module receives the command for selecting the near field communication data exchange format file;

a second sending module configured to return a success response to the terminal when the second determining module determines that the near field communication data exchange format application exists; further configured to return a success response to the terminal when the second determining module determines that the function container file exists; further configured to send the function container file to the terminal when the second receiving module receives the command for reading the function container file; further configured to return a success response to the terminal when the second determining module determines that the near field communication data exchange format file exists; and further configured to send the near field communication data exchange format file generated by a writing module to the terminal; and the writing module configured to write the near field communication device information and a preset application identifier into the near field communication data exchange format file when the second receiving module receives the command for reading the near field communication data exchange format file.

The present disclosure provides a universal method for providing near field communication device information for a user and a system therefor, and thereby users may more conveniently obtain information of a near field communication device.

BRIEF DESCRIPTION OF THE DRAWINGS

In order to more clearly illustrate the technical solutions in embodiments of the present disclosure or in prior art, the drawings needed in the embodiments or the prior art will be briefly described in the below. It will be obvious that the drawings in the following description are merely some of the embodiments of the present disclosure, and those of ordinary skill in the art can obtain other drawings according to these drawings without creative work.

DESCRIPTION OF EMBODIMENTS

The technical solutions of the embodiments of the present disclosure are described clearly and completely in conjunction with the accompanying drawings in the below. Apparently, the described embodiments are merely part but not all of the embodiments of the present disclosure. Based on the described embodiments of the present disclosure, other embodiments obtained by those skilled in the art without any creative work will fall within the protection scope of the present disclosure.

Embodiment 1

Embodiment 1 provides a method for providing near field communication device information for a user, including:

Step S1, sending, by a terminal, a command for selecting a near field communication data exchange format application to a near field communication device;

it should be noted that the near field communication data exchange format is NFC Data Exchange Format, abbreviated as NDEF;

Step S2, determining, by the near field communication device, whether the near field communication data exchange format application exists; if yes, returning a success response to the terminal and executing Step S3; otherwise, ending;

Step S3, sending, by the terminal, a command for selecting a function container file to the near field communication device;

Step S4, determining, by the near field communication device, whether the function container file exists; if yes, returning a success response to the terminal and executing Step S5; otherwise, ending;

Step S5, sending, by the terminal, a command for reading the function container file to the near field communication device;

Step S6, sending, by the near field communication device, the function container file to the terminal;

Step S7, determining, by the terminal and according to the function container file, whether a near field communication data exchange format file identification exists; if yes, executing Step S8; otherwise, ending;

Step S8, sending, by the terminal, a command for selecting the near field communication data exchange format file to the near field communication device;

Step S9, determining, by the near field communication device, whether the near field communication data exchange format file exists; if yes, returning a success response to the terminal and executing Step S10; otherwise, ending;

Step S10, sending, by the terminal, a command for reading the near field communication data exchange format file to the near field communication device;

Step S11, writing, by the near field communication device, near field communication device information and a preset application identifier into the near field communication data exchange format file and sending the near field communication data exchange format file to the terminal; and Step S12, obtaining, by the terminal, an application identifier and the near field communication device information from the near field communication data exchange format file; initiating an application corresponding to the application identifier and storing the near field communication device information to a position readable by the application.

Optionally, the initiating the application corresponding to the application identifier specifically includes: locating, by the terminal, the application corresponding to the application identifier according to the application identifier, and initiating the application.

Optionally, the initiating the application corresponding to the application identifier and storing the near field communication device information to the position readable by the application specifically includes: receiving, by the terminal, an application selecting signal triggered by a user, and opening a corresponding application, determining whether the opened application matches the application identifier; if yes, storing the near field communication device information to a position readable by the application, otherwise, ending.

In more detail, the storing the near field communication device information to the position readable by the application specifically includes: storing the near field communication device information to a clipboard or an application shared area.

Preferably, after Step S6 and before Step S7, the method further includes: determining, by the terminal, whether a configuration of the function container file is valid according to the function container file; if yes, executing Step S7; otherwise, reporting an error and ending.

In more detail, the determining, by the terminal, whether the configuration of the function container file is valid according to the function container file specifically includes:

Step C1, checking, by the terminal, whether a format of the function container file meets a preset condition; if yes, executing Step C2; otherwise, ending;

Step C2, obtaining, by the terminal, version information from the function container file, determining whether a version corresponding to the version information is supported according to the version information; if yes, executing Step C3; otherwise, ending;

Step C3, obtaining, by the terminal, a maximum data reading length and a maximum data sending length from the function container file, determining whether both the maximum data reading length and the maximum data sending length are in a valid range; if yes, executing Step C4; otherwise, ending; and Step C4, obtaining, by the terminal, near field communication data exchange format file information from the function container file, determining whether reading is permitted according to a reading condition in the near field communication data exchange format file information; if yes, executing Step S7; otherwise, ending.

Preferably, after Step S9 and before Step S10, the method further includes:

Step E1, sending, by the terminal, a command for reading a length of the near field communication data exchange format file to the near field communication device; and Step E2, computing, by the near field communication device, the length of the near field communication data exchange format file according to a length of the near field communication device information and a length of the preset application identifier, and sending the length of the near field communication data exchange format file to the terminal.

The present embodiment further provides a method for providing near field communication device information for a user, including:

Step A1, receiving, by a near field communication device, a command, sent by a terminal, for selecting a near field communication data exchange format application and determining whether the near field communication data exchange format application exists; if yes, returning a success response to the terminal and executing Step A2; otherwise, ending;

Step A2, receiving, by the near field communication device, a command, sent by the terminal, for selecting a function container file and determining whether the function container file exists; if yes, sending a success response to the terminal and executing Step A3; otherwise, ending;

Step A3, receiving, by the near field communication device, a command, sent by the terminal, for reading the function container file and sending the function container file to the terminal;

Step A4, receiving, by the near field communication device, a command, sent by the terminal, for selecting a near field communication data exchange format file and determining whether the near field communication data exchange format file exists; if yes, returning a success response to the terminal and executing Step A5; otherwise, ending; and Step A5, receiving, by the near field communication device, a command, sent by the terminal, for reading the near field communication data exchange format file and writing near field communication device information and a preset application identifier into the near field communication data exchange format file and sending the near field communication data exchange format file to the terminal.

Preferably, between Step A4 and Step A5, the method further includes: receiving, by the near field communication device, a command, sent by the terminal, for reading a length of the near field communication data exchange format file, computing the length of the near field communication data exchange format file according to a length of the near field communication device information and a length of the preset application identifier, and sending the length of the near field communication data exchange format file to the terminal.

The present embodiment further provides a method for providing near field communication device information for a user, including:

Step B1, sending, by a terminal, a command for selecting a near field communication data exchange format application to a near field communication device; and executing Step B2 when receiving a success response;

Step B2, sending, by the terminal, a command for selecting a function container file to the near field communication device; and executing Step B3 when receiving a success response;

Step B3, sending, by the terminal, a command for reading the function container file to the near field communication device and receiving the function container file returned by the near field communication device;

Step B4, determining, by the terminal and according to the function container file, whether a near field communication data exchange format file identification exists; if yes, executing Step B5; otherwise, ending;

Step B5, sending, by the terminal, a command for selecting a near field communication data exchange format file to the near field communication device; and executing Step B6 when receiving a success response; and Step B6, sending, by the terminal, a command for reading the near field communication data exchange format file to the near field communication device, receiving the near field communication data exchange format file returned by the near field communication device, obtaining an application identifier and near field communication device information from the near field communication data exchange format file, initiating an application corresponding to the application identifier, and storing the near field communication device information to a position readable by the application.

Optionally, the initiating the application corresponding to the application identifier specifically includes: locating, by the terminal, the application corresponding to the application identifier according to the application identifier, and initiating the application.

Optionally, the initiating the application corresponding to the application identifier and storing the near field communication device information to the position readable by the application specifically includes: receiving, by the terminal, an application selecting signal triggered by a user, opening a corresponding application, determining whether the opened application matches the application identifier; if yes, storing the near field communication device information to the position readable by the application; otherwise, ending.

In more detail, the storing the near field communication device information to the position readable by the application is specifically: storing the near field communication device information to a clipboard or an application shared area.

Preferably, between Step B3 and Step B4, the method further includes: determining, by the terminal, whether a configuration of the function container file is valid according to the function container file; if yes, executing Step B4; otherwise, reporting an error and ending.

Specifically, the determining, by the terminal, whether the configuration of the function container file is valid according to the function container file specifically includes:

Step D1, checking, by the terminal, whether a format of the function container file satisfies a preset condition; if yes, executing Step D2; otherwise, ending;

Step D2, obtaining, by the terminal, version information from the function container file, determining whether a version corresponding to the version information is supported according to the version information; if yes, executing Step D3; otherwise, ending;

Step D3, obtaining, by the terminal, a maximum data reading length and a maximum data sending length from the function container file, determining whether both the maximum data reading length and the maximum data sending length are in a valid range; if yes, executing Step D4; otherwise, ending;

Step D4, obtaining, by the terminal, near field communication data exchange format file information from the function container file, determining whether reading is permitted according to a reading condition in the near field communication data exchange format file information; if yes, executing Step B4; otherwise, ending.

Preferably, between Step B5 to Step B6, the method further includes: sending, by the terminal, a command for reading a length of the near field communication data exchange format file to the near field communication device; and receiving the length of the near field communication data exchange format file, returned by the near field communication device.

Embodiment 2

Figure 1A:
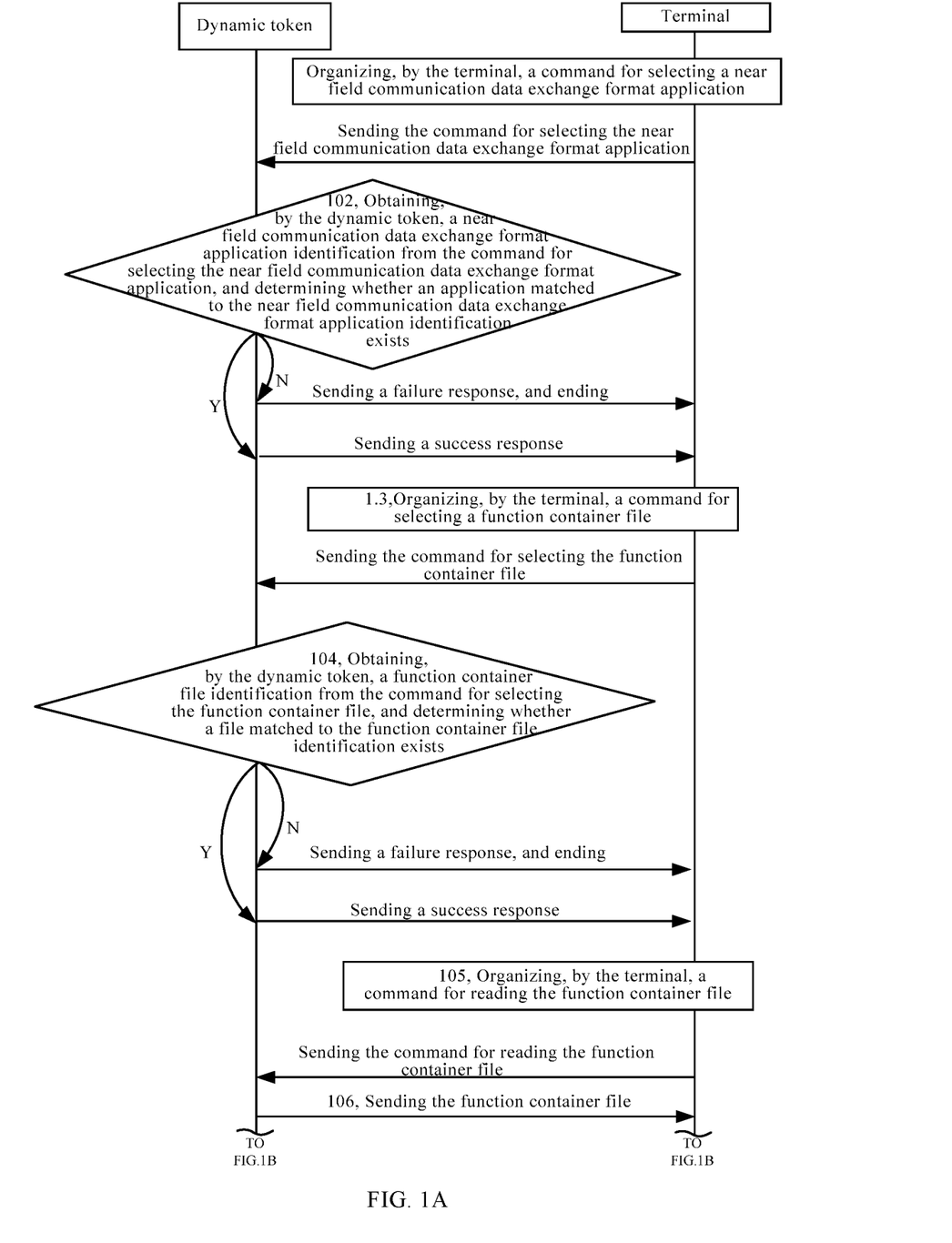
FIGS. 1A and 1B are a flow chart of a method for providing near field communication device information for a user provided by Embodiment 2 of the present disclosure.
Figure 1B:
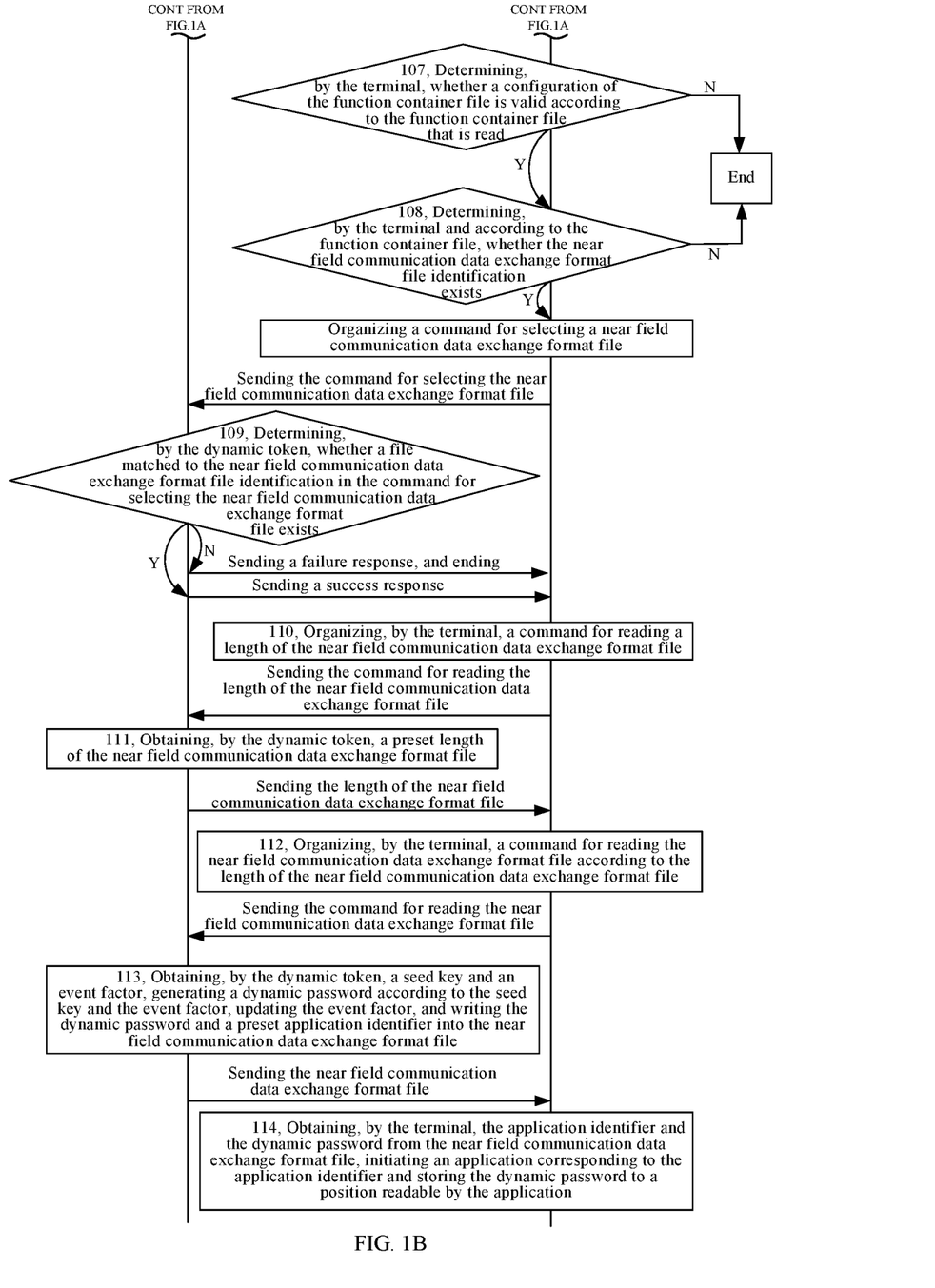

Embodiment 2 provides a method for providing near field communication device information for a user. The method is applicable to a dynamic token and a terminal which support a near field communication. Referring to FIGS. 1A and 1B, the method includes following steps:

Step 101, organizing, by the terminal, a command for selecting a near field communication data exchange format application and sending the command for selecting the near field communication data exchange format application to the dynamic token;

Specifically, a composition of the command for selecting the near field communication data exchange format application is: CLA+INS+P1+P2+Lc+Data+Le; CLA is class byte of the command, INS is instruction byte of the command, P1 and P2 are parameters, Lc is data length in Data of the command, Data is data of the command for selecting the near field communication data exchange format application, and Le is a maximum byte number expected to be returned;

In the present embodiment, the data contained in the Data of the command for selecting the near field communication data exchange format application specifically is a near field communication data exchange format application identification;

Specifically, in the present embodiment, the terminal connects a class byte 00, an instruction byte A4, a parameter 04 00, a data length 07, a near field communication data exchange format application identification D2760000850101 and 00 sequentially to obtain the command for selecting the near field communication data exchange format application, the command for selecting the near field communication data exchange format application specifically is: 00 A4 04 00 07 D2760000850101 00;

Step 102, obtaining, by the dynamic token, the near field communication data exchange format application identification from the command for selecting the near field communication data exchange format application, determining whether an application matched to the near field communication data exchange format application identification exists; if yes, sending a success response to the terminal and executing Step 103; otherwise, sending a failure response to the terminal, and ending.

Specifically, when the dynamic token determines that the application matched to the near field communication data exchange format application identification exists, a success response 9000 is sent to the terminal and Step 103 is executed; when the dynamic token determines that the application matched to the near field communication data exchange format application identification does not exist, a failure response 6A82 is sent to the terminal, ending.

Step 103, organizing, by the terminal, a commend for selecting a function container file and sending the command for selecting the function container file to the dynamic token;

Specifically, data contained in the Data of the command for selecting the function container file is a function container file identification;

Specifically, in the present embodiment, a preset function container file identification is E103; the terminal connects a class byte 00, an instruction byte A4, a parameter 00 0C, a data length 02 and a function container file identification E103 sequentially to obtain the command for selecting the function container file, and the command for selecting the function container file specifically is 00 A4 00 0C 02 E103;

Step 104, obtaining, by the dynamic token, the function container file identification from the command for selecting the function container file, determining whether a file matched to the function container file identification exists; if yes, sending a success response and executing Step 105; otherwise, sending a failure response, and ending;

Specifically, when the dynamic token determines that the file matched to the function container file identification exists, a success response 9000 is sent to the terminal and Step 105 is executed; when the dynamic token determines that the file matched to the function container file identification does not exist, a failure response 6A82 is sent to the terminal, ending;

Step 105, organizing, by the terminal, a command for reading the function container file and sending the command for reading the function container file to the dynamic token;

Specifically, the terminal connects a class byte 00, an instruction byte B0, a parameter 00 0C and a read data length 0F sequentially to obtain the command for reading function container file, and the command for reading the function container file specifically is 00 B0 00 0C 0F;

Step 106, sending, by the dynamic token, the function container file to the terminal;

In the present embodiment, the function container file sent by the dynamic token specifically is 00 0F 20 00 80 00 80 04 06 E1040100 0000;

Step 107, determining, by the terminal, whether a configuration of the function container file is valid according to the function container file that is read; if yes, executing Step 108; otherwise, ending;

Specifically, Step 107 includes:

Step 107-1, checking, by the terminal, whether a format of the function container file meets a preset condition; if yes, executing Step 107-2; otherwise, determining that the configuration of the function container file is not valid;

In the present embodiment, the function container file at least includes: a length of the function container file, version information, a maximum data reading length, a maximum data sending length and near field communication data exchange format file information; more specifically, a format of the near field communication data exchange format file information is TLV format, TAG is an identification of the near field communication data exchange format file information, Length is length of Value, Value includes: a near field communication data exchange format file identification, a size of the near field communication data exchange format file, a reading condition of the near field communication data exchange format file and a writing condition of the near field communication data exchange format file;

In the present embodiment, the function container file read by the terminal specifically is: 000F 20 0080 0080 0406 E10401000000;

Step 107-2, reading, by the terminal, version information from the function container file, determining whether a version corresponding to the version information is supported according to the version information; if yes, executing Step 107-3; otherwise, determining that the configuration of the function container file is not valid;

Specifically, the terminal takes from the function container file a third byte as the version information, determining whether a version corresponding to the version information is supported; if yes, Step 107-3 is executed; otherwise, determining that the configuration of the function container file is not valid;

In the present embodiment, the third byte obtained is 000F;

Step 107-3, obtaining, by the terminal, the maximum data reading length and the maximum data sending length from the function container file and determining whether both the maximum data reading length and the maximum data sending length are in a valid range; if yes, executing Step 107-4; otherwise, determining that the configuration of the function container file is not valid;

Specifically, the terminal takes from the function container file the fourth to fifth bytes as the maximum data reading length and takes the sixth to seventh bytes as the maximum data sending length, determines whether the maximum data reading length and the maximum data sending length are in a valid range; if yes, Step 107-4 is executed; otherwise, determining that the configuration of the function container file is not valid;

In the present embodiment, the terminal takes from the function container file the fourth to fifth bytes 0080 as the maximum data reading length and takes the sixth to seventh bytes 0080 as the maximum data sending length;

Specifically, the terminal determines whether the maximum data reading length is between 000F and FFFF and determines whether the maximum data sending length is between 000D and FFFF; if both are yes, Step 107-4 is executed; otherwise, determining that the configuration of the function container file is not valid;

In the present embodiment, the maximum data reading length is 0080, the maximum data sending length is 0080, both of which meet above requirements, therefore, Step 107-4 is continued to be executed;

Step 107-4, obtaining, by the terminal, the near field communication data exchange format file information from the function container file, determining whether reading is permitted according to a reading condition in the near field communication data exchange format file information; if yes, executing Step 108; otherwise, determining that the configuration of the function container file is not valid;

Specifically, the terminal takes from the function container file the eighth to fifteenth bytes as the near field communication data exchange format file information, determines whether the reading condition in the near field communication data exchange format file information is unconditional reading; if yes, determining that reading is permitted; otherwise, determining that reading is not permitted.

In the present embodiment, the terminal takes from the function container file the eighth to fifteenth bytes 0406 E10401000000 as the near field communication data exchange format file information;

More specifically, the terminal obtains the fifth byte from the near field communication data exchange format file information and determines whether the fifth byte is 00; if yes, determining that reading is permitted; otherwise, determining that reading is not permitted.

Step 108, determining, by the terminal and according to the function container file, whether the near field communication data exchange format file identification exists; if yes, organizing a command for selecting the near field communication data exchange format file and sending the command for selecting the near field communication data exchange format file to the dynamic token, executing Step 109; otherwise, ending;

Specifically, the terminal obtains the tenth to eleventh bytes of the function container file, determines whether the tenth to eleventh bytes are E104; if yes, determining that the near field communication data exchange format file identification exists; otherwise, determining that the near field communication data exchange format file identification does not exist;

The terminal organizing the command for selecting the near field communication data exchange format file specifically is: connecting a class byte 00, an instruction byte A4, a parameter 00 0C, a data length 02 and a data E104 sequentially to obtain the command for selecting the near field communication data exchange format file, and the command for selecting the near field communication data exchange format file specifically is 00 A4 00 0C 02 E104;

Step 109, determining, by the dynamic token, whether a file matched to the near field communication data exchange format file identification in the command for selecting the near field communication data exchange format file exists; if yes, sending a success response to the terminal, executing Step 110; otherwise, sending a failure response to the terminal, and ending;

Specifically, when the dynamic token determines that the file matched to the near field communication data exchange format file identification exists, a success response 9000 is sent to the terminal, and Step 110 is executed; when the dynamic token determines that a file matched to the near field communication data exchange format file identification does not exist, a failure response 6A82 is sent to the terminal, ending;

Step 110, organizing, by the terminal, a command for reading a length of the near field communication data exchange format file and sending the command for reading the length of the near field communication data exchange format file to the dynamic token;

Specifically, the terminal connects a class byte 00, an instruction byte B0, a parameter 00 0C and a read data length 02 sequentially to obtain the command for reading the length of the near field communication data exchange format file; and the command for reading the length of the near field communication data exchange format file specifically is 00 B0 00 0C 02;

Step 111, obtaining, by the dynamic token, a preset length of the near field communication data exchange format file and sending the length of the near field communication data exchange format file to the terminal;

In the present embodiment, the length, obtained by the dynamic token, of the near field communication data exchange format file specifically is 001F;

In the present embodiment, since a dynamic token length generated by the dynamic token is fixed and an application identifier is preset, the length of the near field communication data exchange format file is fixed.

Step 112, organizing, by the terminal, a command for reading the near field communication data exchange format file according to the length of the near field communication data exchange format file and sending the command for reading the near field communication data exchange format file to the dynamic token;

Specifically, the terminal connects a class byte 00, an instruction byte B0, a parameter 00 0C and a read data length 1F sequentially to obtain the command for reading the near field communication data exchange format file, and the command for reading the near field communication data exchange format file specifically is 00 B0 00 0C 1F;

Step 113, obtaining, by the dynamic token, a seed key and an event factor, generating a dynamic password according to the seed key and the event factor, updating the event factor, writing the dynamic password and a preset application identifier into the near field communication data exchange format file and sending the near field communication data exchange format file to the terminal.

The dynamic token connects a tag D1011B5504 of URL, the preset application identifier 6669646F2E6674736166652E636F6D2F6F74702F333030 and a dynamic password 353236 sequentially to obtain the near field communication data exchange format file.

Further, Step 113 specifically is: the dynamic token obtains the seed key and the event factor from data shared area of the dynamic token itself, generates the dynamic password according to the seed key and the event factor and updates the event factor in the data shared area, writes the dynamic password and the preset application identifier into the near field communication data exchange format file and sends the near field communication data exchange format file to the terminal;

It should be noted that the method further includes: determining, by the dynamic token, whether a key-pressing event happens; if yes, the dynamic token obtains the seed key and the event factor from the data shared area of the dynamic token itself, generating and displaying the dynamic password according to the seed key and the event factor, and then ending.

Optionally, when the length of the dynamic password is not fixed, Step 111 to Step 113 can be replaced with following steps:

Step 201, obtaining, by the dynamic token, the seed key and the event factor, generating the dynamic password according to the seed key and the event factor, updating the event factor, computing the length of the near field communication data exchange format file according to the dynamic password and the preset application identifier, and sending the length of the near field communication data exchange format file;

Step 202, organizing, by the terminal, the command for reading the near field communication data exchange format file according to the length of the near field communication data exchange format file and sending the command for reading the near field communication data exchange format file;

Step 203, writing, by the dynamic token, the dynamic password and the preset application identifier into the near field communication data exchange format file and sending the near field communication data exchange format file to the terminal.

Step 114, obtaining, by the terminal, the application identifier and the dynamic password from the near field communication data exchange format file, initiating an application corresponding to the application identifier and storing the dynamic password to a position readable by the application.

Specifically, in the present embodiment, the terminal takes from the near field communication data exchange format file the first to fifth bytes, specifically D1011B5504 as a character string of the ULR tag; takes the sixth to twenty-fifth bytes, specifically 6669646F2E6674736166652E636F6D2F6F74702F as a character string of the application identifier; takes the twenty-sixth to thirty-first bytes, specifically 333030353236 as a character string of the dynamic password; and converts the obtained character strings based on ASCII code, to obtain a converted URL tag, i.e., https://; an application identifier, i.e., fido.ftsafe.com/otp/, and a dynamic password, i.e., 300526;

When an operating system of the terminal is IOS operating system, Step 114 specifically is: the terminal waiting for an application selecting signal triggered by a user, opening a corresponding application according to the application selecting signal, determining whether the opened application is matched to the application identifier; if yes, copying the dynamic password to a clipboard; otherwise, ending;

Specifically, the terminal calls a member function setString of UIPasteboard class to copy the dynamic password to the clipboard.

When the operating system of the terminal is Android operating system, Step 114 specifically is: locating, by the terminal, an application corresponding to the application identifier according to the application identifier, opening a corresponding application and copying the dynamic password to the clipboard.

The terminal calls a getSystemService(CLIPBOARD_SERVICE) to obtain an authority, and gives the authority to an object of ClipboardManager class, then calls a setPrimaryClip( ) interface of the object of ClipboardManager class, and pastes the dynamic password to the clipboard.

Further, when the operating system of the terminal is Android operating system, the terminal can store the dynamic password to an application shared area.

When the dynamic token which supports the near field communication contacts with the terminal, the dynamic token sends a dynamic password generated by itself and a preset application identifier to the terminal, the terminal initiates an application corresponding to the application identifier, stores the dynamic password in a position readable by the application so as to be convenient for the application to perform subsequent operations. For example, when a user logs on to a social application, it should be noted that a logon process of the social process requires inputting a dynamic password; the user only needs to contact a dynamic token held by the user with the terminal, the terminal will initiates the social application and stores the dynamic password to a position readable by the application so as to be convenient for the application to perform subsequent operations; the subsequent operations can be filling the dynamic password automatically into an input box to complete a logon operation.

Embodiment 3

Figure 2:
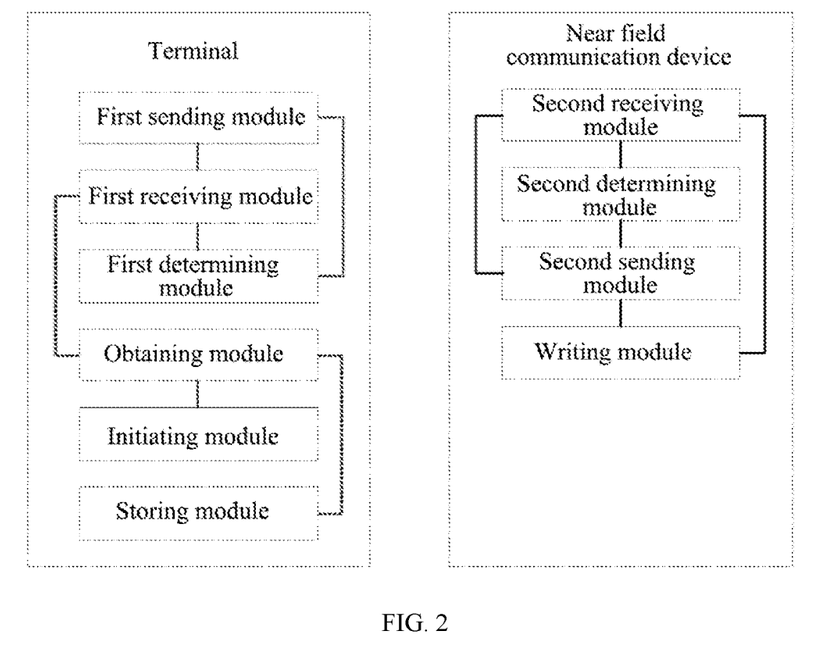
FIG. 2 is a block diagram of a system for providing near field communication device information for a user provided by Embodiment 3 of the present disclosure.

The present embodiment provides a system for providing near field communication device information for a user. Referring to FIG. 2, the system includes a terminal and a near field communication device;

the terminal includes:

a first sending module configured to send a command for selecting a near field communication data exchange format application to the near field communication device; further configured to send a command for selecting a function container file to the near field communication device when a first receiving module receives a success response after sending the command for selecting the near field communication data exchange format application; further configured to send a command for reading the function container file to the near field communication device when the first receiving module receives a success response after sending the command for selecting the function container file; further configured to send a command for selecting a near field communication data exchange format file to the near field communication device when a first determining module determines that the near field communication data exchange format file exists according to the function container file; and further configured to send a command for reading the near field communication data exchange format file to the near field communication device when the first receiving module receives a success response after sending the command for selecting the near field communication data exchange format file;

the first receiving module configured to receive a success response returned by the near field communication device; further configured to receive the function container file returned by the near field communication device; and further configured to receive the near field communication data exchange format file sent by the near field communication device;

the first determining module configured to, when the first receiving module receives the function container file, determine whether a near field communication data exchange format file identification exists according to the function container file;

an obtaining module configured to, when the first receiving module receives the near field communication data exchange format file sent by the near field communication device, obtain an application identifier and near field communication device information from the near field communication data exchange format file;

an initiating module configured to initiate an application corresponding to the application identifier obtained by the obtaining module; and a storing module configured to store the near field communication device information obtained by the obtaining module to a position readable by the application; and the near field communication device includes:

a second receiving module configured to receive the command, sent by the terminal, for selecting the near field communication data exchange format application; further configured to receive the command, sent by the terminal, for selecting the function container file; further configured to receive the command, sent by the terminal, for reading the function container file; further configured to receive the command, sent by the terminal, for selecting the near field communication data exchange format file; and further configured to receive the command, sent by the terminal, for reading the near field communication data exchange format file;

a second determining module configured to determine whether the near field communication data exchange format application exists when the second receiving module receives the command for selecting the near field communication data exchange format application; further configured to determine whether the function container file exists when the second receiving module receives the command for selecting the function container file; further configured to determine whether the near field communication data exchange format file exists when the second receiving module receives the command for selecting the near field communication data exchange format file;

a second sending module configured to return a success response to the terminal when the second determining module determines that the near field communication data exchange format application exists; further configured to return a success response to the terminal when the second determining module determines that the function container file exists; further configured to send the function container file to the terminal when the second receiving module receives the command for reading the function container file; further configured to return a success response to the terminal when the second determining module determines that the near field communication data exchange format file exists; and further configured to send the near field communication data exchange format file generated by a writing module to the terminal; and the writing module configured to write the near field communication device information and a preset application identifier into the near field communication data exchange format file when the second receiving module receives the command for reading the near field communication data exchange format file.

Optionally, the initiating module is specifically configured to locate the application corresponding to the application identifier according to the application identifier obtained by the obtaining module, and initiate the application.

Optionally, the initiating module is specifically configured to receive an application selecting signal triggered by a user and open a corresponding application;

the terminal further includes a third determining module;

the third determining module is configured to determine whether the application opened by the initiating module matches the application identifier obtained by the obtaining module;

the storing module is specifically configured to store the near field communication device information obtained by the obtaining module to the position readable by the application when the third determining module determines that the opened application matches the application identifier obtained by the obtaining module.

More specifically, the storing module is specifically configured to store the near field communication device information obtained by the obtaining module to a clipboard or an application shared area.

It should be noted that the near field communication device is specifically a dynamic token which supports a near field communication, and the near field communication device information is specifically a dynamic password generated by the dynamic token;

Correspondingly, the writing module is specifically configured to generate the dynamic password and write the dynamic password and the preset application identifier into the near field communication data exchange format file.

More specifically, the writing module is specifically configured to obtain a seed key and an event factor, generate the dynamic password according to the seed key and the event factor, update the event factor, and write the dynamic password and the preset application identifier into the near field communication data exchange format file.

Preferably, the terminal further includes: a fourth determining module;

the fourth determining module is configured to determine whether a configuration of the function container file is valid according to the function container file after the first receiving module receives the function container file;

the first determining module is specifically configured to, when the fourth determining module determines that the configuration is valid, determine whether the near field communication data exchange format file identification exists according to the function container file.

More specifically, the fourth determining module specifically includes:

a first determining unit configured to check whether a format of the function container file received by the first receiving module meets a preset condition;

a second determining unit configured to, when the first determining unit determines that format of the function container file meets the preset condition, obtain version information from the function container file, and determines whether a version corresponding to the version information is supported according to the version information;

a third determining unit configured to, when the second determining unit determines the version corresponding to the version information is supported, obtain a maximum data reading length and a maximum data sending length from the function container file, and determines whether both the maximum data reading length and the maximum data sending length are in a valid range;

a fourth determining unit configured to, when the third determining unit determines that both the maximum data reading length and the maximum data sending length are in the valid range, obtain near field communication data exchange format file information from the function container file, and determine whether reading is permitted according to a reading condition in the near field communication data exchange format file information; and the first determining module is specifically configured to, when the fourth determining unit determines that the reading condition is permitting reading, determine whether the near field communication data exchange format file identification exists according to the function container file.

Optionally, the first sending module is further configured to, when the first receiving module receives a success response after sending the command for selecting the near field communication data exchange format file, send a command for reading a length of the near field communication data exchange format file to the near field communication device;

the second receiving module is further configured to receive the command, sent by the terminal, for reading the length of the near field communication data exchange format file;

the near field communication device further includes: a computing module;

the computing module is configured to, when the second receiving module receives the command for reading the length of the near field communication data exchange format file, compute the length of the near field communication data exchange format file according to a length of the near field communication device information and a length of the preset application identifier;

the second sending module is further configured to send the length of the near field communication data exchange format file to the terminal;

the first receiving module is further configured to receive the length of the near field communication data exchange format file sent by the near field communication device.

The present embodiment provides a near field communication device, which includes:

a second receiving module configured to receive a command, sent by a terminal, for selecting a near field communication data exchange format application; further configured to receive a command, sent by the terminal, for selecting a function container file; further configured to receive a command, sent by the terminal, for reading the function container file; further configured to receive a command, sent by the terminal, for selecting a near field communication data exchange format file; and further configured to receive a command, sent by the terminal, for reading the near field communication data exchange format file;

a second determining module configured to determine whether the near field communication data exchange format application exists when the second receiving module receives the command for selecting the near field communication data exchange format application; further configured to determine whether the function container file exists when the second receiving module receives the command for selecting the function container file; further configured to determine whether the near field communication data exchange format file exists when the second receiving module receives the command for selecting the near field communication data exchange format file;

a second sending module configured to return a success response to the terminal when the second determining module determines that the near field communication data exchange format application exists; further configured to return a success response to the terminal when the second determining module determines that the function container file exists; further configured to send the function container file to the terminal when the second receiving module receives the command for reading the function container file; further configured to return a success response to the terminal when the second determining module determines that the near field communication data exchange format file exists; and further configured to send the near field communication data exchange format file generated by a writing module to the terminal; and the writing module configured to write near field communication device information and a preset application identifier into the near field communication data exchange format file when the second receiving module receives the command for reading the near field communication data exchange format file.

Specifically, the near field communication device is specifically a dynamic token which supports a near field communication, and the near field communication device information is specifically a dynamic password generated by the dynamic token;

Correspondingly, the writing module is specifically configured to generate the dynamic password and write the dynamic password and the preset application identifier into the near field communication data exchange format file.

In more detail, the writing module is specifically configured to obtain a seed key and an event factor, generate a dynamic password according to the seed key and the event factor, update the event factor, and write the dynamic password and the preset application identifier into the near field communication data exchange format file.

Optionally, the second receiving module is further configured to receive the command, sent by the terminal, for reading a length of the near field communication data exchange format file;

the near field communication device further includes: a computing module;

the computing module is configured to, when the second receiving module receives the command for reading the length of the near field communication data exchange format file, compute the length of the near field communication data exchange format file according to a length of the near field communication device information and a length of the preset application identifier;

the second sending module is further configured to send the length of the near field communication data exchange format file to the terminal.

The present embodiment provides a terminal, which includes:

a first sending module configured to send a command for selecting a near field communication data exchange format application to the near field communication device; further configured to send a command for selecting the function container file to the near field communication device when a first receiving module receives a success response after sending the command for selecting the near field communication data exchange format application; further configured to send a command for reading the function container file to the near field communication device when the first receiving module receives a success response after sending the command for selecting the function container file; further configured to send a command for selecting the near field communication data exchange format file to the near field communication device when the first determining module determines that the near field communication data exchange format file exists according to the function container file; and further configured to send a command for reading the near field communication data exchange format file to the near field communication device when the first receiving module receives a success response after sending the command for selecting the near field communication data exchange format file;

the first receiving module configured to receive a success response returned by the near field communication device; further configured to receive the function container file returned by the near field communication device; and further configured to receive the near field communication data exchange format file sent by the near field communication device;

a first determining module configured to, when the first receiving module receives the function container file, determine whether a near field communication data exchange format file identification exists according to the function container file;

an obtaining module configured to, when the first receiving module receives the near field communication data exchange format file sent by the near field communication device, obtain an application identifier and near field communication device information from the near field communication data exchange format file;

an initiating module configured to initiate an application corresponding to the application identifier obtained by the obtaining module; and a storing module configured to store the near field communication device information obtained by the obtaining module to a position readable by the application.

Optionally, the initiating module is specifically configured to locate an application corresponding to the application identifier according to the application identifier obtained by the obtaining module, and initiate the application.

Optionally, the initiating module is specifically configured to receive an application selecting signal triggered by a user and open a corresponding application;

the terminal further includes a third determining module;

the third determining module is configured to determine whether the application opened by the initiating module matches the application identifier obtained by the obtaining module;

the storing module is specifically configured to store the near field communication device information obtained by the obtaining module to the position readable by the application when the third determining module determines that the opened application matches the application identifier obtained by the obtaining module.

In more detail, the storing module is specifically configured to store the near field communication device information obtained by the obtaining module to a clipboard or an application shared area.

Preferably, the terminal further includes: a fourth determining module;

the fourth determining module is configured to determine whether a configuration of the function container file is valid according to the function container file after the first receiving module receives the function container file;

the first determining module is specifically configured to, when the fourth determining module determines that the configuration is valid, determine whether the near field communication data exchange format file identification exists according to the function container file.

The fourth determining module specifically includes:

a first determining unit configured to check whether a format of the function container file received by the first receiving module meets a preset condition;

a second determining unit configured to, when the first determining unit determines that the format of the function container file meets the preset condition, obtain version information from the function container file, and determines whether a version corresponding to the version information is supported according to the version information;

a third determining unit configured to, when the second determining unit determines the version corresponding to the version information is supported, obtain a maximum data reading length and a maximum data sending length from the function container file, and determines whether both the maximum data reading length and the maximum data sending length are in a valid range;

a fourth determining unit configured to, when the third determining unit determines that both the maximum data reading length and the maximum data sending length are in the valid range, obtain near field communication data exchange format file information from the function container file, and determine whether reading is permitted according to a reading condition in the near field communication data exchange format file information; and the first determining module is specifically configured to, when the fourth determining unit determines that the reading condition is permitting reading, determine whether the near field communication data exchange format file identification exists according to the function container file;

Optionally, the first sending module is specifically configured to, when the first receiving module receives a success response after sending the command for selecting the near field communication data exchange format file, send the command for reading a length of the near field communication data exchange format file to the near field communication device; and the first receiving module is further configured to receive the length of the near field communication data exchange format file sent by the near field communication device.

The descriptions above are only specific embodiments of the present disclosure, but the protection scope of the present disclosure is not limited to this, and any changes or replacements that can be easily thought of within the technical scope disclosed by the present disclosure by those skilled familiar with the technical field shall fall within the protection scope of the present disclosure. Therefore, the protection scope of the present disclosure shall be subject to the protection scope of the claim.

What is claimed is:

1. A method for providing near field communication device information for a user, comprising:

Step S1, sending, by a terminal, a command for selecting a near field communication data exchange format application to a near field communication device;

Step S2, determining, by the near field communication device, whether the near field communication data exchange format application exists; if yes, returning a success response to the terminal and executing Step S3; otherwise, ending;

Step S3, sending, by the terminal, a command for selecting a function container file to the near field communication device;

Step S4, determining, by the near field communication device, whether the function container file exists; if yes, returning a success response to the terminal and executing Step S5; otherwise, ending;

Step S5, sending, by the terminal, a command for reading the function container file to the near field communication device;

Step S6, sending, by the near field communication device, the function container file to the terminal;

Step S7, determining, by the terminal and according to the function container file, whether a near field communication data exchange format file identification exists; if yes, executing Step S8; otherwise, ending;

Step S8, sending, by the terminal, a command for selecting the near field communication data exchange format file to the near field communication device;

Step S9, determining, by the near field communication device, whether the near field communication data exchange format file exists; if yes, returning a success response to the terminal and executing Step S10; otherwise, ending;

Step S10, sending, by the terminal, a command for reading the near field communication data exchange format file to the near field communication device;

Step S11, writing, by the near field communication device, near field communication device information and a preset application identifier into the near field communication data exchange format file and sending the near field communication data exchange format file to the terminal; and Step S12, obtaining, by the terminal, an application identifier and the near field communication device information from the near field communication data exchange format file; initiating an application corresponding to the application identifier and storing the near field communication device information to a position readable by the application.

2. The method of claim 1, wherein the initiating the application corresponding to the application identifier specifically comprises: locating, by the terminal, the application corresponding to the application identifier according to the application identifier, and initiating the application.

3. The method of claim 1, wherein the initiating the application corresponding to the application identifier and storing the near field communication device information to the position readable by the application specifically comprises: receiving, by the terminal, an application selecting signal triggered by a user and opening a corresponding application, determining whether the opened application matches the application identifier; if yes, storing the near field communication device information to a position readable by the application, otherwise, ending.

4. The method of claim 1, wherein the storing the near field communication device information to the position readable by the application specifically comprises: storing the near field communication device information to a clipboard or an application shared area.

5. The method of claim 1, wherein the near field communication device is specifically a dynamic token which supports a near field communication, and the near field communication device information is specifically a dynamic password generated by the dynamic token;

Step S11 specifically comprises: generating, by the dynamic token, the dynamic password, writing the dynamic password and the preset application identifier into the near field communication data exchange format file and sending the near field communication data exchange format file to the terminal.

6. The method of claim 1, wherein after Step S6 and before Step S7, the method further comprises: determining, by the terminal, whether a configuration of the function container file is valid according to the function container file; if yes, executing Step S7; otherwise, reporting an error and ending.

7. The method of claim 1, wherein after Step S9 and before Step S10, the method further comprises:
   Step E1, sending, by the terminal, a command for reading a length of the near field communication data exchange format file to the near field communication device;
   Step E2, computing, by the near field communication device, the length of the near field communication data exchange format file according to a length of the near field communication device information and a length of the preset application identifier and sending the length of the near field communication data exchange format file to the terminal.

8. A method for providing near field communication device information for a user, comprising:
   Step A1, receiving, by a near field communication device, a command, sent by a terminal, for selecting a near field communication data exchange format application, and determining whether the near field communication data exchange format application exists; if yes, returning a success response to the terminal and executing Step A2; otherwise, ending;
   Step A2, receiving, by the near field communication device, a command, sent by the terminal, for selecting a function container file and determining whether the function container file exists; if yes, returning a success response to the terminal and executing Step A3; otherwise, ending;
   Step A3, receiving, by the near field communication device, a command, sent by the terminal, for reading the function container file and sending the function container file to the terminal;
   Step A4, receiving, by the near field communication device, a command, sent by the terminal, for selecting a near field communication data exchange format file, and determining whether the near field communication data exchange format file exists; if yes, returning a success response to the terminal and executing Step A5; otherwise, ending;
   Step A5, receiving, by the near field communication device, a command, sent by the terminal, for reading the near field communication data exchange format file, writing near field communication device information and a preset application identifier into the near field communication data exchange format file and sending the near field communication data exchange format file to the terminal.

9. The method of claim 8, wherein the near field communication device is specifically a dynamic token which supports a near field communication, and the near field communication device information is specifically a dynamic password generated by the dynamic token;
   Step A5 is specifically that: receiving, by the dynamic token, the command, sent by the terminal, for reading the near field communication data exchange format file, generating a dynamic password, writing the dynamic password and the preset application identifier into the near field communication data exchange format file and sending the near field communication data exchange format file to the terminal.

10. The method of claim 8, wherein between Step A4 and Step A5, the method further comprises: receiving, by the near field communication device, a command, sent by the terminal, for reading a length of the near field communication data exchange format file, computing the length of the near field communication data exchange format file according to a length of the near field communication device information and a length of the preset application identifier, and sending the length of the near field communication data exchange format file to the terminal.

11. A system for providing near field communication device information for a user, comprising: a terminal and a near field communication device;
   the terminal comprises a processor, the processor is configured to:
   send a command for selecting a near field communication data exchange format application to the near field communication device; send a command for selecting a function container file to the near field communication device when a success response is received after sending the command for selecting the near field communication data exchange format application; send a command for reading the function container file to the near field communication device when a success response is received after sending the command for selecting the function container file; send a command for selecting a near field communication data exchange format file to the near field communication device when it is determined that the near field communication data exchange format file exists according to the function container file; and send a command for reading the near field communication data exchange format file to the near field communication device when a success response is received after sending the command for selecting the near field communication data exchange format file;
   receive a success response returned by the near field communication device; receive the function container file returned by the near field communication device; and receive the near field communication data exchange format file sent by the near field communication device;
   when the function container file is received, determine whether a near field communication data exchange format file identification exists according to the function container file;
   when the near field communication data exchange format file sent by the near field communication device is received, obtain an application identifier and near field communication device information from the near field communication data exchange format file;
   initiate an application corresponding to the application identifier obtained; and
   store the near field communication device information obtained to a position readable by the application; and
   the near field communication device comprises a processor, the processor is configured to:
   receive the command, sent by the terminal, for selecting the near field communication data exchange format application; receive the command, sent by the terminal, for selecting the function container file; receive the command, sent by the terminal, for reading the function container file; receive the command, sent by the terminal, for selecting the near field communication data exchange format file; and receive the command, sent by the terminal, for reading the near field communication data exchange format file;
   determine whether the near field communication data exchange format application exists when the command for selecting the near field communication data exchange format application is received; determine whether the function container file exists when the command for selecting the function container file is received; determine whether the near field communication data exchange format file exists when the command for selecting the near field communication data exchange format file is received;

return a success response to the terminal when it is determined that the near field communication data exchange format application exists; return a success response to the terminal when it is determined that the function container file exists; send the function container file to the terminal when the command for reading the function container file is received; return a success response to the terminal when it is determined that the near field communication data exchange format file exists; and send the near field communication data exchange format file to the terminal; and write the near field communication device information and a preset application identifier into the near field communication data exchange format file when the command for reading the near field communication data exchange format file is received.

12. The system of claim 11, wherein the processor of the terminal is further configured to locate the application corresponding to the application identifier according to the application identifier obtained, and initiate the application.

13. The system of claim 11, wherein the processor of the terminal is further configured to receive an application selecting signal triggered by a user and open a corresponding application;

determine whether the application opened by the initiating module matches the application identifier obtained;

store the near field communication device information obtained to the position readable by the application when it is determined that the opened application matches the application identifier obtained.

14. The system of claim 11, wherein the processor of the terminal is further configured to store the near field communication device information obtained to a clipboard or an application shared area.

15. The system of claim 11, wherein the near field communication device is specifically a dynamic token which supports a near field communication, and the near field communication device information is specifically a dynamic password generated by the dynamic token;

the processor of the near field communication device is further configured to generate the dynamic password and write the dynamic password and the preset application identifier into the near field communication data exchange format file.

16. The system of claim 11, wherein the processor of the terminal is further configured to:

determine whether a configuration of the function container file is valid according to the function container file after the function container file is received; and when it is determined that the configuration is valid, determine whether the near field communication data exchange format file identification exists according to the function container file.

17. The system of claim 11, wherein the processor of the terminal is further configured to, when the success response is received after sending the command for selecting the near field communication data exchange format file, send a command for reading a length of the near field communication data exchange format file to the near field communication device;

the processor of near field communication device is further configured to:

receive the command, sent by the terminal, for reading the length of the near field communication data exchange format file;

when the command for reading the length of the near field communication data exchange format file is received, compute the length of the near field communication data exchange format file according to a length of the near field communication device information and a length of the preset application identifier;

send the length of the near field communication data exchange format file to the terminal; and the processor of the terminal is further configured to receive the length of the near field communication data exchange format file from the near field communication device.

18. A near field communication device, comprising a processor, wherein the processor is configured to:

receive a command, sent from a terminal, for selecting a near field communication data exchange format application; receive a command, sent by the terminal, for selecting a function container file; receive a command, sent by the terminal, for reading the function container file; receive a command, sent by the terminal, for selecting a near field communication data exchange format file; and receive a command, sent by the terminal, for reading the near field communication data exchange format file;

determine whether the near field communication data exchange format application exists when the command for selecting the near field communication data exchange format application is received; determine whether the function container file exists when the command for selecting the function container file is received; determine whether the near field communication data exchange format file exists when the command for selecting the near field communication data exchange format file is received;

return a success response to the terminal when it is determined that the near field communication data exchange format application exists; return a success response to the terminal when it is determined that the function container file exists; send the function container file to the terminal when the command for reading the function container file is received; return a success response to the terminal when it is determined that the near field communication data exchange format file exists; send the near field communication data exchange format file into the terminal; and write near field communication device information and a preset application identifier into the near field communication data exchange format file when the command for reading the near field communication data exchange format file is received.

19. The near field communication device of claim 18, wherein the near field communication device is specifically a dynamic token which supports a near field communication, and the near field communication device information is specifically a dynamic password generated by the dynamic token;

the processor of the near field communication device is specifically configured to generate the dynamic password and write the dynamic password and the preset application identifier into the near field communication data exchange format file.

20. The near field communication device of claim 18, wherein
   the processor of the near field communication device is further configured to
   receive the command, sent by the terminal, for reading a length of the near field communication data exchange format file;
   when the command for reading the length of the near field communication data exchange format file is received, compute the length of the near field communication data exchange format file according to a length of the near field communication device information and a length of the preset application identifier; and
   send the length of the near field communication data exchange format file length to the terminal.

* * * * *